US007174557B2

(12) United States Patent
Sanghvi et al.

(10) Patent No.: US 7,174,557 B2
(45) Date of Patent: Feb. 6, 2007

(54) METHOD AND APPARATUS FOR EVENT DISTRIBUTION AND EVENT HANDLING IN AN ENTERPRISE

(75) Inventors: Ashvinkumar J. Sanghvi, Issaquah, WA (US); Patrick R. Kenny, Redmond, WA (US); Michael A. Thatcher, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 09/875,245

(22) Filed: Jun. 5, 2001

(65) Prior Publication Data

US 2002/0010804 A1 Jan. 24, 2002

Related U.S. Application Data

(60) Provisional application No. 60/210,347, filed on Jun. 7, 2000.

(51) Int. Cl.
G06F 9/46 (2006.01)
G06F 15/16 (2006.01)

(52) U.S. Cl. ............... 719/318; 719/313; 709/217

(58) Field of Classification Search ........ 709/310–317, 709/318, 328, 217–224, 200, 201, 216, 203, 709/226, 206, 207; 707/9, 530; 705/35, 705/14; 706/11, 47; 703/4, 6; 348/88; 710/11; 717/1, 168; 380/271
See application file for complete search history.

(56) References Cited

U.S. PATENT DOCUMENTS

| 5,655,081 | A | * | 8/1997 | Bonnell et al. ............ 709/202 |
| 5,724,589 | A | * | 3/1998 | Wold ........................ 709/318 |
| 5,872,928 | A | | 2/1999 | Lewis et al. |
| 5,889,953 | A | | 3/1999 | Thebaut et al. |
| 6,058,416 | A | | 5/2000 | Mukherjee et al. |
| 6,154,849 | A | | 11/2000 | Xia |
| 6,195,685 | B1 | | 2/2001 | Mukherjee et al. |
| 6,243,747 | B1 | | 6/2001 | Lewis et al. |
| 6,269,473 | B1 | | 7/2001 | Freed et al. |
| 6,275,232 | B1 | | 8/2001 | Cataudella et al. |
| 6,381,639 | B1 | | 4/2002 | Thebaut et al. |
| 6,466,932 | B1 | | 10/2002 | Dennis et al. |

(Continued)

OTHER PUBLICATIONS

Abstract for "Integrated Network Management VI. Distributed Management for the Networked Millennium", Proceedings of the Sixth IFIP/IEEE International Symposium on Integrated Network Management, May 24-28, 1999.

(Continued)

*Primary Examiner*—John Follansbee
*Assistant Examiner*—Haresh Patel
(74) *Attorney, Agent, or Firm*—Lee & Hayes, PLLC

(57) ABSTRACT

An event distribution and event handling system receives a first event at a first event filter. The first event filter has a set of associated filter criteria, which is applied to the first event. If the first event satisfies the filter criteria, the first event is transformed into a second event and the second event is communicated to a second event filter having a set of associated filter criteria. The second event filter is associated with an event consumer, which performs an action if the second event satisfies the filter criteria associated with the second event filter. The second event includes an event header having a standard format and a payload having multiple payload objects.

20 Claims, 8 Drawing Sheets

U.S. PATENT DOCUMENTS

| | | | |
|---|---|---|---|
| 6,470,384 B1 * | 10/2002 | O'Brien et al. | 709/223 |
| 6,473,851 B1 | 10/2002 | Plutowski | |
| 6,584,502 B1 | 6/2003 | Natarajan et al. | |
| 6,678,835 B1 | 1/2004 | Shah et al. | |
| 6,708,187 B1 | 3/2004 | Shanumgam et al. | |
| 6,748,455 B1 * | 6/2004 | Hinson et al. | 719/318 |
| 6,766,368 B1 * | 7/2004 | Jakobson et al. | 709/224 |
| 6,799,208 B1 | 9/2004 | Sankaranarayan et al. | |
| 6,829,770 B1 * | 12/2004 | Hinson et al. | 719/318 |
| 2001/0049086 A1 * | 12/2001 | Paquette et al. | 434/307 A |
| 2002/0016840 A1 | 2/2002 | Herzog et al. | |
| 2005/0044554 A1 * | 2/2005 | Hinson et al. | 719/318 |
| 2005/0071849 A1 * | 3/2005 | Hinson et al. | 719/315 |

OTHER PUBLICATIONS

Abstract for "Applying configurable event-triggered services in heterogeneous, distributed information systems", Koschel et al., Proceedings of EFIS '99: Second International Workshop on Engineering Federated Information Systems, May 5-7, 1999, pp. 147-157.

"CIM II: The Integrated Enterprise", Lopes, P., Society of Manufacturing Engineers, Technical Paper, MS92-322, 1992, pp. 21-1 to 21-5, and 21-7.

"A geographically distributed enterprise simulation system", Ammerlahn et al., Future Generation Computer Systems 17, 2000, pp. 135-146.

"Hot Topics in Network Management", Malek, M., NOMS 2000, 2000 IEEE/IFIP Networks Operations and Management Symposium, 2000, 2 pages.

"Business rules", Odell, J., Object Magazine, Jan. 1995, pp. 53-56.

"Integration of Simulation with Enterprise Models", Srinivasan et al., Proceedings of the 1997 Winter Simulation Conference, pp. 1352-1356.

"A Process Oriented Method for the Reuse of CIM Models", Janusz, B., IFAC Manufacturing Systems: Modelling, Management and Control, 1997, pp. 219-224.

"Simulation of Business Processes in an Enterprise Modelling System", Pardasani et al., Proceedings of the SCSC, Jul. 24-26, 1995, pp. 440-445.

"A Messaging-Baseed Architecture for Enterprise Application Integration", Joseph, T., IEEE, Proceedings of the 15th International Conference on Data Engineering, Mar. 23-26, 1999, pp. 62-63.

"Bespa: a Event-based Mediation Mechanism for Systems Collaboration", Kajihara et al., NTT Software Laboratories, NTT R&D, vol. 46, No. 6, 1997, pp. 45-50.

Burkhart, Roger, "Process-based Definition of Enterprise Models," Enterprise Integration Modeling, Proceedings of the First International Conference, 1992, pp. 229-238.

Corcoran, Cate T., "SMS: A Desktop Manager for the Enterprise?", Datamation, Mar. 15, 1996, pp. 71-72.

Troubleshooting Group Policy in Windows 2000, Published by Microsoft Corporation, published in Jan. 2000, pp. i to vi and 1-34.

Windows 2000 Active Directory by Alistair G. Lowe-Norris, Published by O'Riely, 1st edition Jan. 2000, pp. 1-20.

* cited by examiner

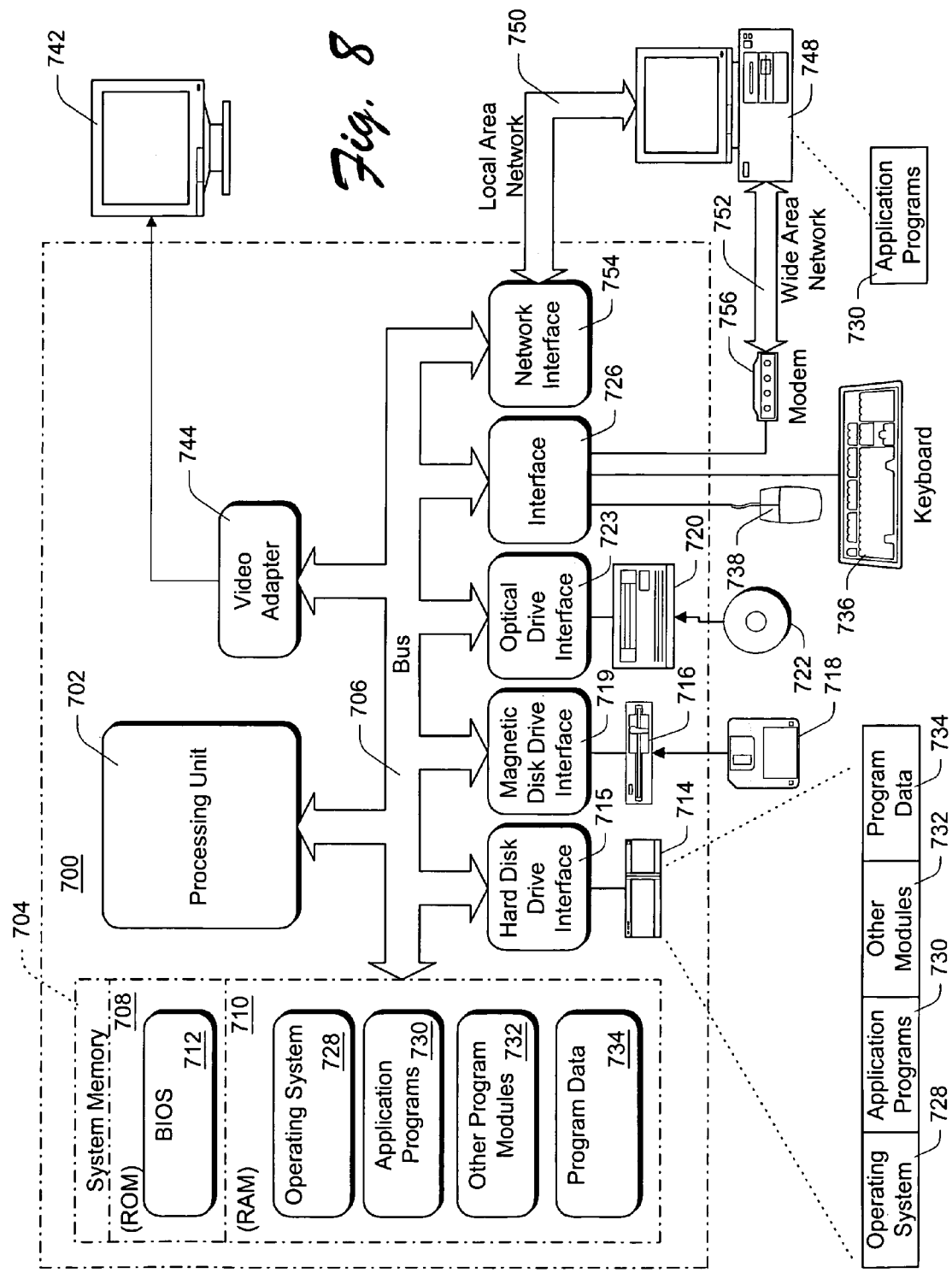

METHOD AND APPARATUS FOR EVENT DISTRIBUTION AND EVENT HANDLING IN AN ENTERPRISE

RELATED APPLICATIONS

This application claims the benefit of U.S. Provisional Application No. 60/210,347, filed Jun. 7, 2000.

TECHNICAL FIELD

The present invention relates to computing systems and, more particularly, to the distribution and handling of events generated by components, services and applications in a computing environment.

BACKGROUND

Computer systems, such as servers and desktop personal computers, are expected to operate without constant monitoring. These computer systems typically perform various tasks without the user's knowledge. When performing these tasks, the computer system often encounters events that require a particular action (such as logging the event, generating an alert for a particular system or application, or performing an action in response to the event). Various mechanisms are available to handle these events.

A computing enterprise typically includes one or more networks, services, and systems that exchange data and other information with one another. The enterprise may include one or more security mechanisms to safeguard data and authenticate users and may utilize one or more different data transmission protocols. At any particular time, one or more networks, services or systems may be down (e.g., powered down or disconnected from one or more networks). Networks, services or systems can be down for scheduled maintenance, upgrades, overload or failure. Application programs attempting to obtain event data must contend with the various networks, services, and systems in the enterprise when they are down. Additionally, application programs must contend with the security and network topology limitations of the enterprise as well as the various protocols used in the enterprise.

Existing operating system components, services, and applications generate events having a variety of different formats. Thus, the event data format may be quite different from one event source to another in the same enterprise. In existing systems, a single system receives events from multiple event sources and provides the events to the appropriate application or device that utilizes the event data. The use of this single system requires the event interpretation activities and the event response actions to be understood by the administrator of the enterprise. In enterprises with a large number of event formats and a large number of event response actions, understanding all event formats and all response actions can place a significant burden on the administrator of the enterprise. Further, each time a new event format is added to the enterprise (e.g., through the addition of a new event source) or a new event response action is created, the administrator must learn the new event format or new response actions.

The system and method described herein addresses these limitations by separating the handling of the event interpretation activities from the handling of the event response actions. The system and method also provide a standardized header format for event data which is used for all event sources in an enterprise.

SUMMARY

The event distribution and event handling system and method described herein provide for the separate handling of event interpretation activities and event response actions, thereby allowing different administrators to manage the two different activities. Thus, a single administrator need not understand both the event interpretation activities as well as the event response actions. Each administrator can focus on the management of one of the activities. Further, the use of a standardized header format for all events, regardless of the event source, simplifies the management tasks of each administrator.

In one embodiment, a first event is received at a first event filter. The first event filter has an associated filter criteria, which is applied to the first event. If the first event satisfies the filter criteria then the first event is transformed into a second event and the second event is communicated to a second event filter having an associated filter criteria. The second event filter is also associated with an event consumer, which performs an action if the second event satisfies the filter criteria associated with the second event filter.

In a described embodiment, the second event includes a header having multiple parameters. The event header has a standard data format regardless of event source.

In a particular embodiment, the second event includes a payload including multiple payload objects.

In another embodiment, the second event filter has no knowledge of the first event.

BRIEF DESCRIPTION OF THE DRAWINGS

FIG. 8 illustrates an example of a suitable operating environment in which the event distribution and event handling system and method may be implemented.

DETAILED DESCRIPTION

Figure 1:
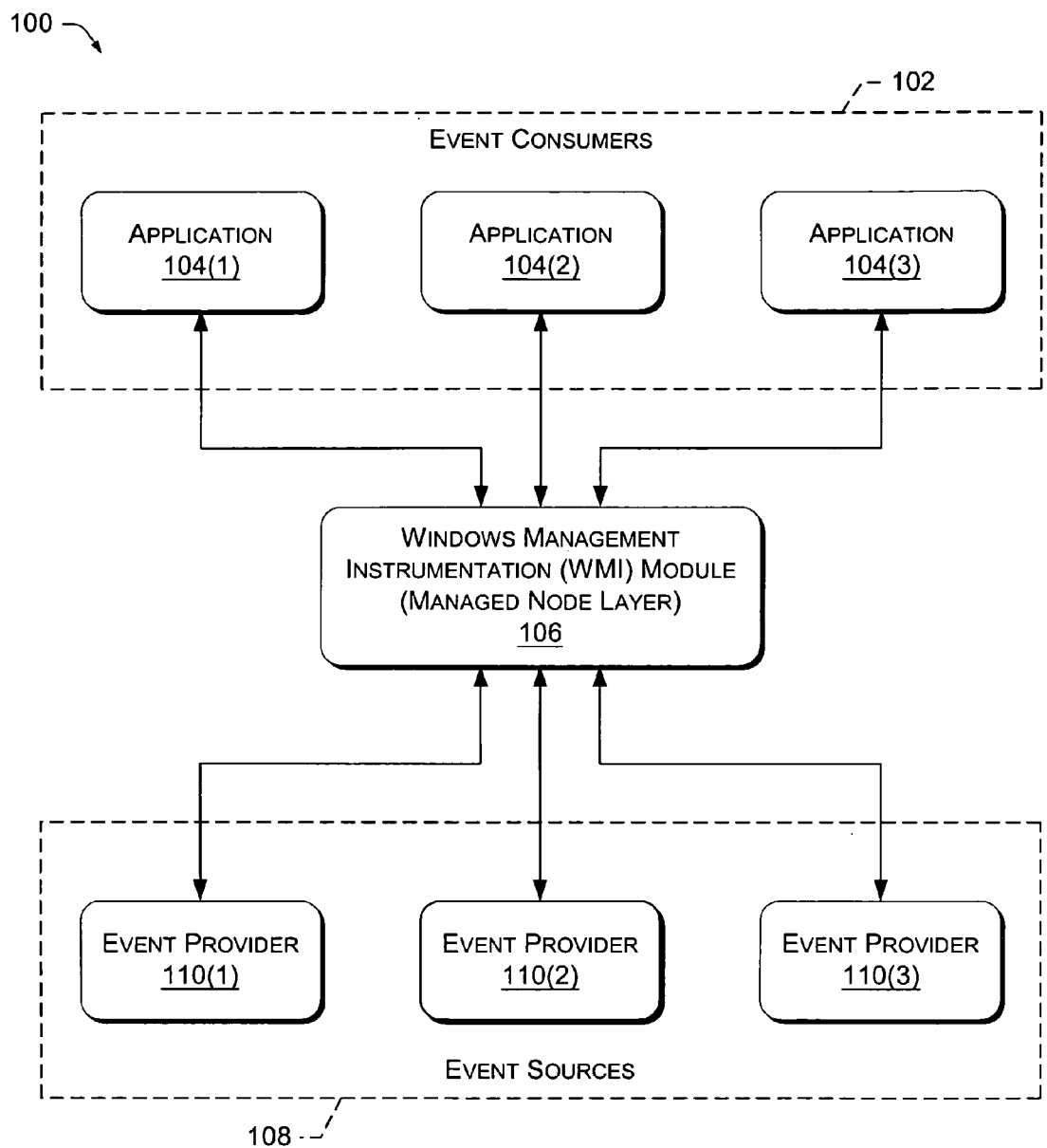
FIG. 1 illustrates a block diagram of a system that receives event information from multiple event providers and provides event information to multiple event consumers.

The system and method described herein provide for the simplified distribution and handling of events in an enterprise. By using a standard header format for event data, the administrative task of defining and processing events is simplified. Additionally, the separation of the event transformation activities from the event actions allows each administrator to focus on one type of activity rather than requiring detailed knowledge of both types of activities. Thus, the system and method described herein provides for the improved distribution and handling of events in an enterprise.

Web-Based Enterprise Management (WBEM) provides uniform access to management information throughout an enterprise. WBEM is an industry initiative to develop technology for accessing management information in an enterprise environment. This management information includes, for example, information on the state of system memory, inventories of currently installed client applications, and other information related to the status of the system. A particular embodiment of the event-handling system is implemented using Windows Management Instrumentation (WMI) developed by Microsoft Corporation of Redmond, Wash., which provides an infrastructure to handle various events generated by event sources throughout an enterprise. WMI is Microsoft Corporation's implementation of WBEM.

WMI technology enables systems, applications, networks, and other managed components to be represented using the Common Information Model (CIM) designed by the Distributed Management Task Force (DMTF). CIM is an extensible data model for representing objects that exist in typical management environments. CIM is able to model anything in the managed environment, regardless of the location of the data source. The Managed Object Format (MOF) language is used to define and store modeled data. In addition to data modeling, WMI provides a set of base services that include query-based information retrieval and event notification. Access to these services and to the management data is provided through a single programming interface.

WMI classes define the basic units of management. Each WMI class is a template for a type of managed object. For example, Win32_DiskDrive is a model representing a physical disk drive. For each physical disk drive that exists, there is an instance of the Win32_DiskDrive class. WMI classes may contain properties, which describe the data of the class and methods, which describe the behavior of the class.

WMI classes describe managed objects that are independent of a particular implementation or technology. WMI includes an eventing subsystem that follows the publish-subscribe model, in which an event consumer subscribes for a selection of events (generated by one or more event providers) and performs an action as a result of receiving the event. WMI also provides a centralized mechanism for collecting and storing event data. This stored event data is accessible by other systems via WMI tools and/or application programming interfaces (APIs).

Although particular embodiments are discussed herein as using WMI, alternate embodiments may utilize any enterprise management system or application, whether web-based or otherwise. The event providers and event consumers discussed herein are selected for purposes of explanation. The teachings of the present invention can be used with any type of event provider and any type of event consumer. Additionally, the event-handling system and method described herein can be applied to any type of enterprise or other arrangement of computing devices, applications, and/or networks.

FIG. 1 illustrates a block diagram of a system 100 that receives event information from multiple event providers 108 (i.e., event sources) and provides event information to multiple event consumers 102 (i.e., the users of the event data). System 100 includes a WMI module 106, which receives event data from multiple event sources 108 and receives requests for information (e.g., notification of particular events) from multiple event consumers 102. Event sources 108 may include, for example, managed nodes or managed systems in a network. The multiple event sources are identified as event providers 110. The multiple event consumers are identified as applications 104.

WMI module 106 shown in FIG. 1 represents the managed node layer of the WMI module. As discussed below, the WMI module 106 may also include a central store layer, which may include user interface functionality. The different layers of WMI module 106 manage different types of activities and/or perform different types of functions.

Event providers 110 include, for example, systems, services or applications that generate event data. An exemplary event provider is a disk drive (or an application that monitors the status of a disk drive). The disk drive may generate an event indicating the available storage capacity on the disk drive or indicating the amount of data currently stored on the disk drive. The disk drive may also generate an event indicating that the disk drive is nearly full of data (e.g., when ninety-five percent or more of the disk drive's capacity is used).

Event consumers 102 may request to be notified of certain events (also referred to as "subscribing" to an event). An example event consumer is an application that manages multiple storage devices in an enterprise. The application may request to receive events generated by any of the disk drives or other storage devices in the enterprise. The application can use this event information to distribute storage tasks among the multiple storage devices based on the available capacity of each device and/or the quantity of read or write requests received by each storage device.

Figure 2:
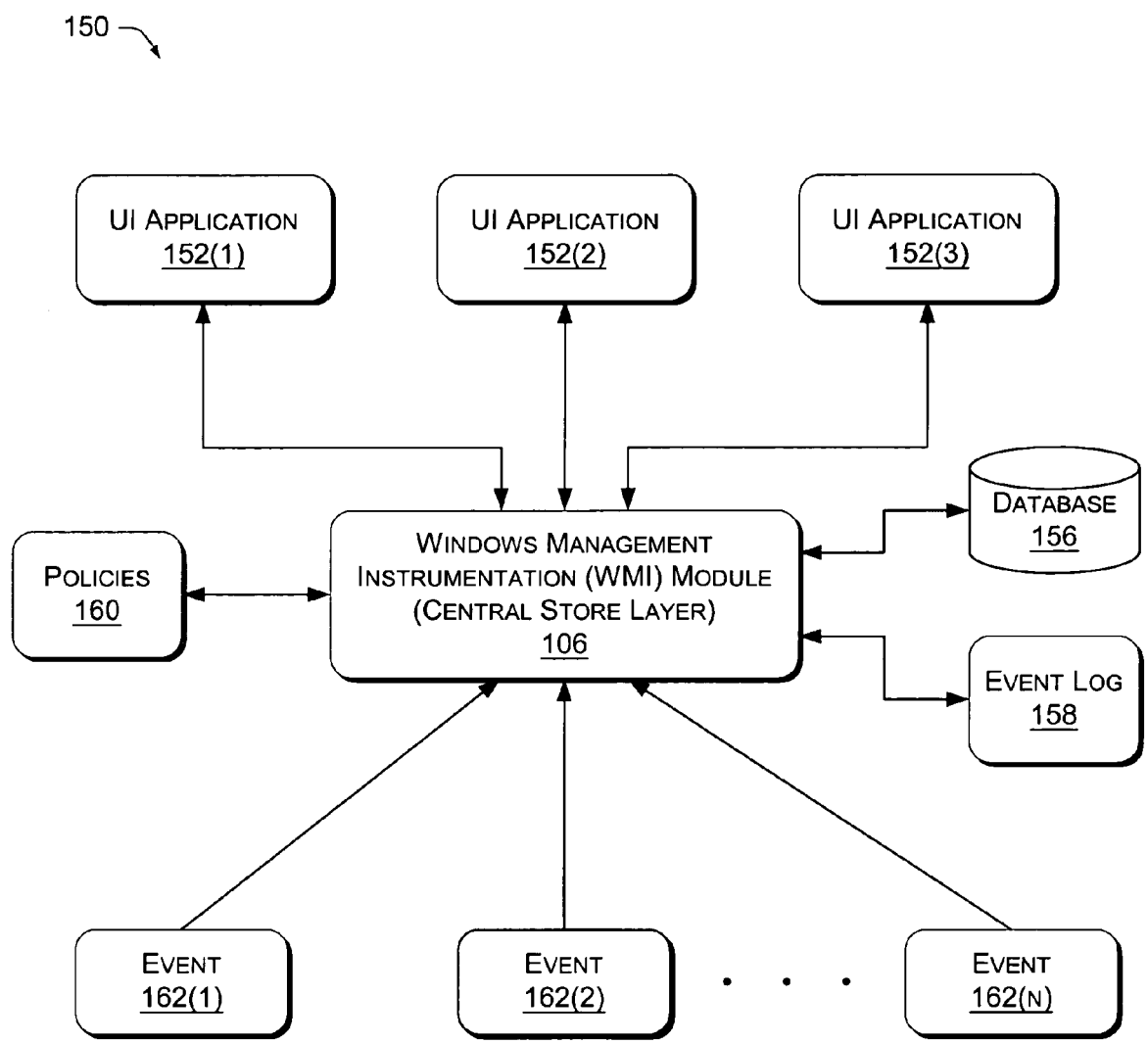
FIG. 2 illustrates a block diagram of a system that receives events and logs those events to an event log.

FIG. 2 illustrates a block diagram of a system 150 that receives events and logs those events to an event log. System 150 includes a central store layer of WMI module 106, which is coupled to multiple user interface (UI) applications 152. UI applications 152 are used to access WMI module 106 to retrieve data, manage systems, and configure various enterprise management parameters. The central store layer of WMI module 106 provides for the centralized logging and storage of event data received from various nodes and various networks in an enterprise. WMI module 106 is also coupled to receive events 162 from one or more event sources. For example, events may be received, for example, from the managed node layer of WMI module 106, discussed above with respect to FIG. 1, from an event forwarding application (e.g., application 104), or from one or more event providers (e.g., event provider 110).

System 150 also includes a set of policies 160, which are accessible by WMI module 106. Policies 160 may control the configuration of one or more systems in the enterprise. Other policies may define various activities, such as event filtering, event correlation, and the forwarding of events to particular devices or applications. A database 156 is coupled to WMI module 106. Database 156 stores various information related to the enterprise. For example, database 156 can store event data (i.e., creating an event log), policy data, and enterprise configuration information.

WMI module 106 is also coupled to an event log 158. The event log 158 uses WMI features to provide a distributed architecture that is capable of selecting, filtering, correlating, forwarding, storing, and delivering event data in an enterprise. The event log 158 allows users, such as administrators, to request data related to a particular event, request data from a particular node or device in the enterprise, define the manner in which events are correlated with one another, define how certain events should be forwarded, and define how to store event data. Data requests may be accessed from the event log 158 using, for example, a particular UI application 152. The event log 158 uses an event provider model that allows an application, device or driver to generate events.

The event log 158 provides a policy-based administration of the enterprise. The policy infrastructure allows administrators to set a policy in the Directory Service (DS) and the WMI module ensures that the proper set of WMI objects (e.g., filters, bindings, correlators, consumers, and configuration objects) are delivered to the proper devices or applications in the enterprise.

Table 1 below identifies various types of event providers available in a particular embodiment. Additionally, the table includes a description of the events generated by each event provider. For example, the Win32 Provider generates events that include information related to the operating system, computer system, peripheral devices, file systems, and security for a particular device (such as a computer system) in the enterprise.

TABLE 1

| Event Provider | Description of Events Provided |
| --- | --- |
| Win32 Provider | Supplies information about the operating system, computer system, peripheral devices, file systems, and security. |
| WDM Provider | Supplies low-level Windows Driver Model (WDM) information for user input devices, storage devices, network interfaces, and communications ports. |
| Event Log Provider | Allows the reading of Windows NT event log entries, controls the configuration of event log administrative options, and event log backup. |
| Registry Provider | Allows registry keys to be created, read, and written. WMI events can be generated when specified Registry keys are modified. |
| Performance Counter Provider | Exposes the raw performance counter information used to compute various performance values. |
| Active Directory Provider | Acts as a gateway to information stored in Microsoft Active Directory services. Allows information from both WMI and Active Directory to be accessed using a single API. |
| Windows Installer Provider | Supplies information about applications installed with the Windows Installer. |
| SNMP Provider | Acts as a gateway to systems and devices that use SNMP for management. Allows SNMP traps to be automatically mapped to WMI events. |

Figure 3:
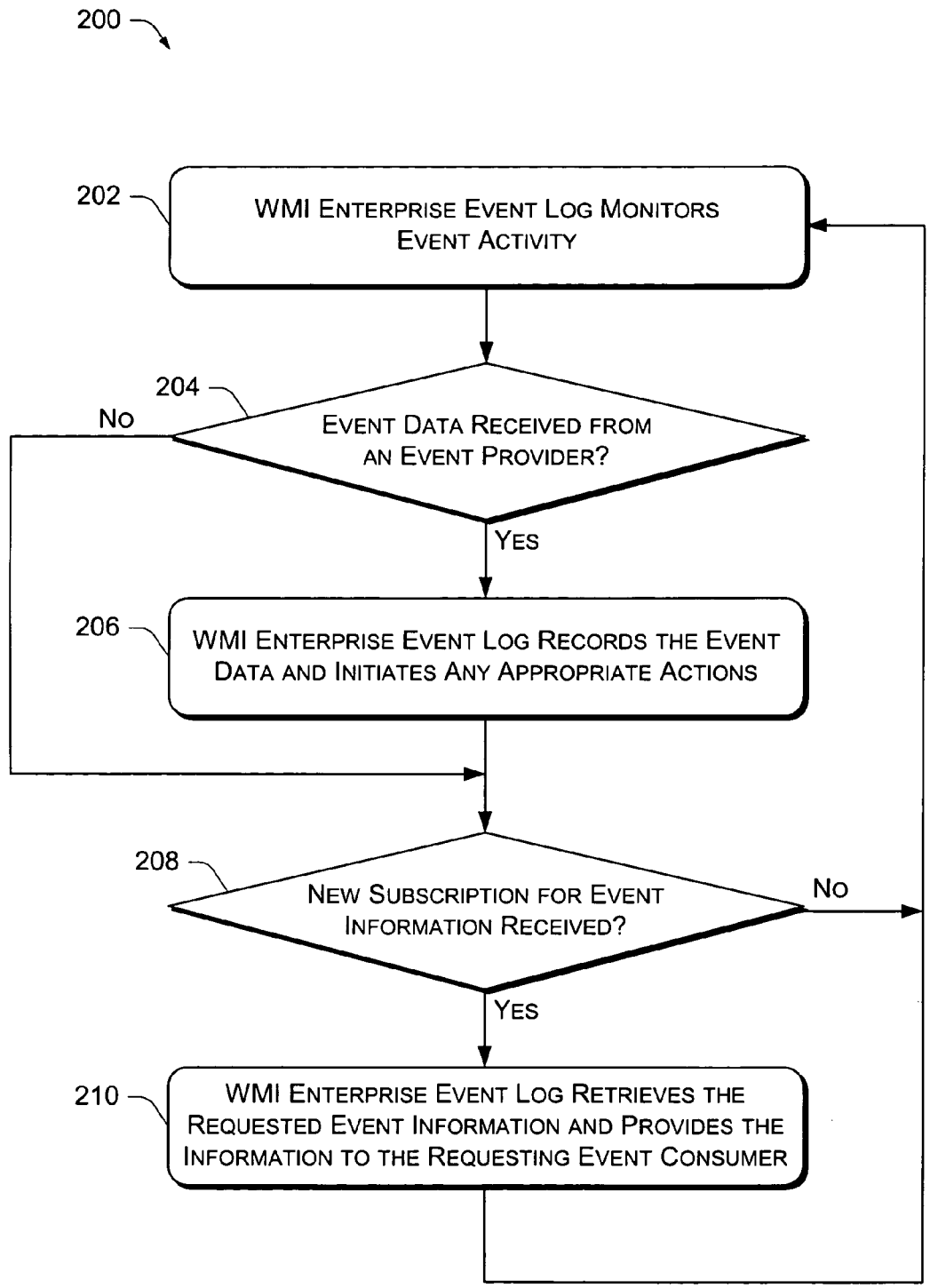
FIG. 3 is a flow diagram illustrating an event-handling procedure.

FIG. 3 is a flow diagram illustrating an event-handling procedure 200. The WMI enterprise event log monitors event activity throughout the enterprise (block 202). The procedure 200 determines whether event data has been received from an event provider (block 204). If event data has been received, the WMI enterprise event log records the event data and initiates any appropriate actions (block 206). An example action includes notifying an event consumer of the event (e.g., if the event consumer previously subscribed to such an event).

At block 208, the procedure 200 determines whether a new subscription for event information has been received. The procedure 200 may also determine whether a request to revise an existing subscription has been received. If a new subscription (or a revised subscription) is received, the procedure continues to block 210 where the WMI enterprise event log retrieves the requested event information and provides the information to the requesting event customer. Alternatively, the procedure may log the subscription request and notify the requesting event consumer when the next event is received that qualifies under the consumer's subscription request.

Figure 4:
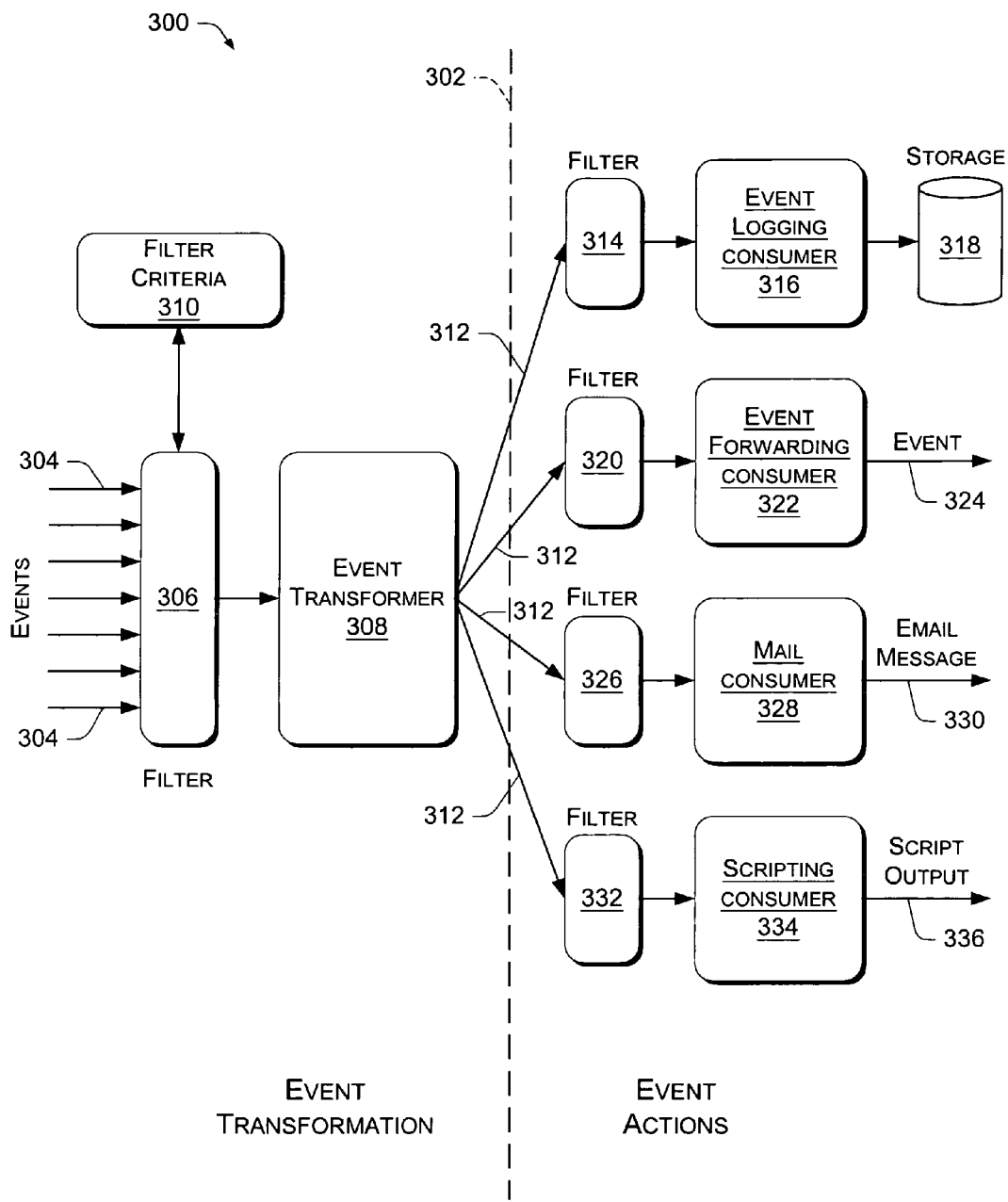
FIG. 4 illustrates a block diagram of a system that receives multiple events, transforms received events into distributed events having a standard header and a flexible payload, and processes distributed events with one or more event consumers.

FIG. 4 illustrates a block diagram of a system 300 that receives multiple events, transforms received events into distributed events having a standard header and a flexible payload, and processes distributed events with one or more event consumers. As discussed above, the method and apparatus described herein provides for the decoupling (or separation) of event transformation activities and event actions. This decoupling allows the event transformation activities to be configured and administered by one person or entity without requiring knowledge of the event actions. Similarly, the event activities can be configured and administered without requiring knowledge of the event transformation activities.

Event transformation activities include, for example, filtering, selecting, aggregating, and correlating events and transforming those events into a distributed event with the proper classification. Event actions include, for example, forwarding events, logging events, running a script, or sending an email in response to a particular distributed event. Broken line 302 in FIG. 4 identifies the decoupling of the event transformation activities (to the left of broken line 302) and the event actions (to the right of broken line 302).

Referring to FIG. 4, multiple events 304 are received by an event filter 306, which applies various filter criteria 310 to determine which of the received events are passed through the filter to an event transformer 308.

The following query statement is typical of an event filter:

Select * from_InstanceModificationEvent within 10 where targetInstance isa Win32_BaseService and targetinstance.state="stopped"

The above query statement is interpreted as follows:

* is anything

InstanceModificationEvent is the type of event the system (or administrator) is interested in (e.g., the type of event being subscribed to)

within 10 means within 10 seconds where targetInstance isa Win32_BaseService refers to the specific object that the system (or administrator) is concerned with and targetinstance.state="stopped" refers to the specific property of the object (Win32_BaseService) that will actually change its value (stopped) and, as a result of the change to this value, generate an event The event transformer 308 converts the received event into a standardized event format, referred to as a distributed event. Regardless of the event source or the event format, the event transformer 308 converts the event into a standard distributed event that is understood by all filters and consumers responsible for performing event actions (i.e., the filters and consumers to the right of broken line 302).

The event transformer 308 provides each distributed event 312 to multiple filters 314, 320, 326, and 332. Each filter 314, 320, 326, and 332 includes various filter criteria that determines what distributed event characteristics are required to allow the distributed event to pass through the filter. Although each distributed event 312 is sent to all four filters, the distributed event may be rejected (i.e., not pass through the filter) by any or all of the filters. Similarly, a particular distributed event may pass through two or more different filters, depending on the filter criteria associated with each filter.

Each filter 314, 320, 326, and 332 is associated with a consumer (i.e., an event consumer) 316, 322, 328, and 334, respectively. For example, distributed events that pass through filter 314 are provided to event logging consumer 316, which logs the event data to a storage device 318. The logged data can be retrieved at a later time for analysis or other purposes. Distributed events that meet the criteria of filter 320 are provided to event forwarding consumer 322, which generates a forwarded event 324 that is communicated to one or more destinations. Distributed events that satisfy the criteria of filter 326 are provided to mail consumer 328, which generates and sends an email message 330 in response to receipt of each distributed event. The email message 330 may contain information about one or more distributed events (such as the event type or the source of the event). Distributed events that pass through filter 332 are provided to scripting consumer 334, which executes a script that may perform a function and/or generate a script output 336.

Although the example of FIG. 4 illustrates four filters 314, 320, 326, and 332 (and associated consumers 316, 322, 328, and 334, respectively) that receive distributed events 312, alternate embodiments may include any number of filters and associated consumers. Further, the actions performed by consumers 316, 322, 328, and 334 are provided as examples. Alternate consumers may perform any type of action in response to a distributed event.

Figure 5:
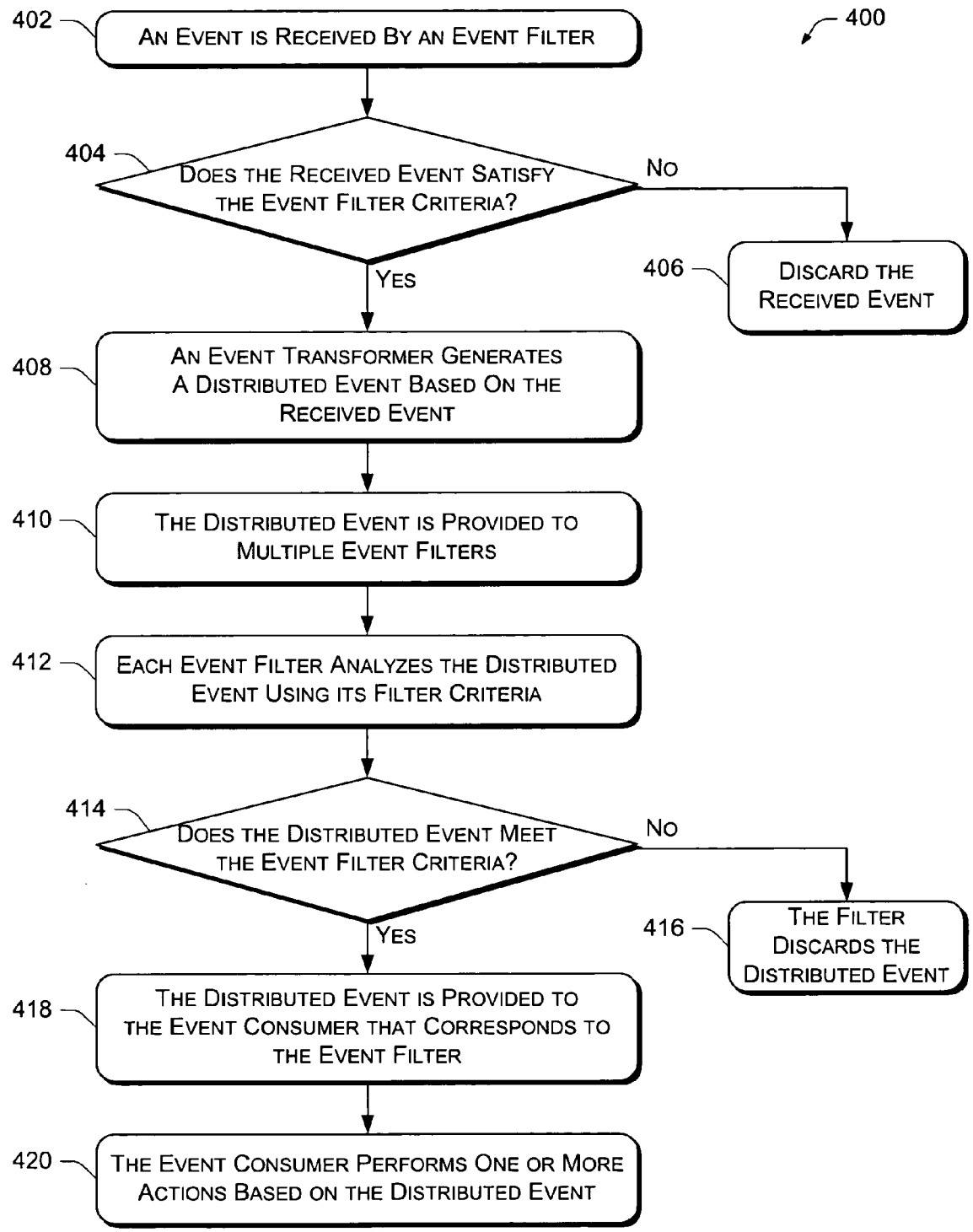
FIG. 5 is a flow diagram illustrating a procedure for handling events in the system of FIG. 4.

FIG. 5 is a flow diagram illustrating a procedure 400 for handling events in the system of FIG. 4. An event is received by an event filter (block 420), such as filter 306 in FIG. 4. The procedure 400 determines whether the received event satisfies the event filter criteria (block 404). If the received event does not satisfy the event filter criteria, then the received event is discarded (block 406). Discarding an event may include ignoring the event or deleting the event and any reference to the event from storage registers or other storage mechanisms. If the received event satisfies the event filter criteria (i.e., passes through the filter), an event transformer (also referred to as an event transform application) generates a distributed event based on the received event (block 408). The distributed event contains a standard header and a flexible payload, as discussed below with reference to FIG. 6.

The distributed event is provided to multiple event filters from the event transformer (block 410). Each event filter analyzes the distributed event using its own filter criteria (block 412). Next, each event filter determines whether the distributed event meets the event filter's criteria (block 414). This determination is performed by each event filter based on the filter criteria for that particular event filter. If the distributed event does not meet the criteria for a particular event filter, that event filter discards the distributed event (block 416). However, if the distributed event satisfies the criteria for a particular event filter, that event filter provides the distributed event to the event consumer that corresponds to the particular event filter (block 418). The event consumer then performs one or more actions based on the distributed event (block 420). For example, the actions may include generating an email message and logging the distributed event data for future reference. The procedure of FIG. 5 is repeated for each received event.

Figure 6:
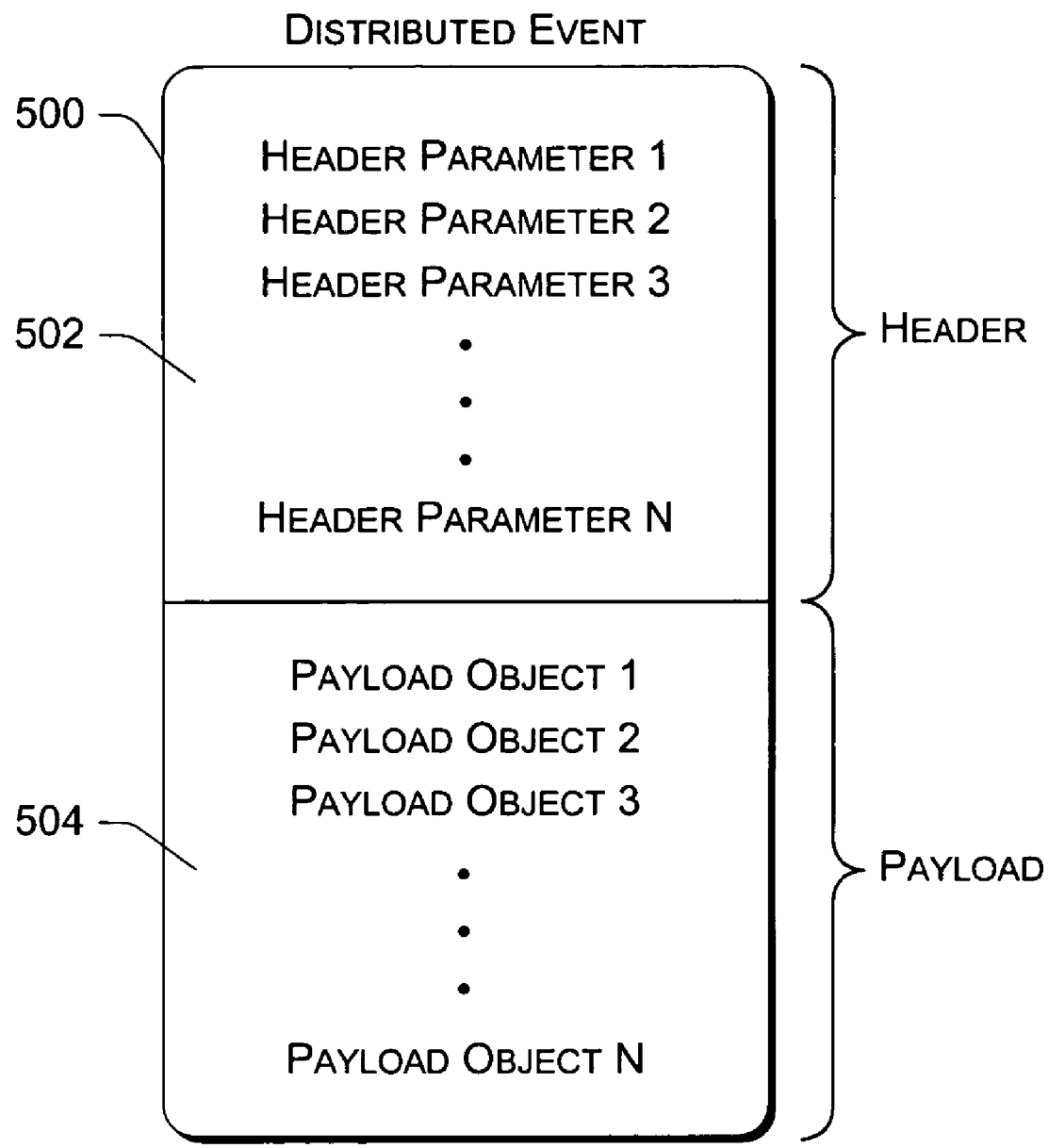
FIG. 6 illustrates a distributed event having a standard header and a flexible payload.

FIG. 6 illustrates a distributed event 500 having a standard header 502 and a flexible payload 504. The distributed event 500 is generated by, for example, the event transformer 308 in FIG. 4. The distributed event 500 includes standard header 502, which contains multiple header parameters (labeled "Header Parameter 1" through "Header Parameter N"). The header parameters are used by the event filters to determine whether the distributed event 500 meets the filter criteria (i.e., whether the distributed event 500 should be provided to the consumer associated with the filter). The header 502 is formatted in a standard manner such that all filters can interpret the header and all of the distributed events 500 use the same header format, regardless of the event source.

An example of the header information and the payload information contained in an example distributed event is provided below. The properties in this example are part of the header information, except the last property (original event), which is part of the payload information. All "on the fly" processing of events, such as filtering, forwarding, routing, logging and notifying, can be based on the header information while the analysis of the event will depend on the payload information.

Example distributed event:

```
Class: Microsoft__EELEvent
Derived from: ___ExtrinsicEvent
        [Description ("The EELEvent class represents a EEL event (Distributed"
        "Event Log)."), DisplayName("Distributed Event Log Event"),
        Locale (0x409), UUID ("DA2D3ECD-FA5C-4290-B1F1-
0427EA20F8F6")]
class Microsoft__EELEvent: ___ExtrinsicEvent
        {
                [Description ("The EventID property is the identifier. It identifies "
                "the event. This is specific to the source that generated the event "
                "log entry, and is used, together with SourceSubsystemName, "
                "to uniquely identify an event type."), DisplayName("Event ID")
                ]
        unit64 EventID;
                [Description ("The SourceSubsystemType property reveals the "
                "source within the node - Ntevent log, SMS log, etc.."),
                DisplayName("Source Subsystem Type")
                ]
        string SourceSubsystemType;
                [Description ("The SourceSubsystemName specifies the name of"
```

-continued

```
        "the source (application, service, driver, subsystem) that generated "
        "the entry."), DisplayName("Source Subsystem Name")
        ]
    string SourceSubsystemName;
        [Description ("The ComputerName property specifies the name of"
        "the computer that generated this event."), DisplayName("Computer
        Name")
        ]
    string ComputerName;
        [Description ("The DeliveredBy property specifies the name of the "
        "computer that delivered this event. This may be the same as the "
        "ComputerName property, but may often be different."),
        DisplayName("Delivered By")
        ]
    string DeliveredBy;
        [Description ("The Category property represent the 'standard' "
        "category of the event as determined by system management
        guidelines."), DisplayName("Category")
        ]
    string Category;
        [Description ("The Subcategory property represents additional "
        "categorization of the event with the Category."),
        DisplayName("Sub-Category")
        ]
    string Subcategory;
        [Description ("The Severity property shows the severity level "
        "assigned to the event by the logging facility."),
        DisplayName("Severity")
        ]
    uint16 Severity;
        [Description ("The Priority property contains the priority level "
        "assigned to the event by the logging facility."),
        DisplayName("Priority")
        ]
    uint16 Priority;
        [Description ("The Message property has additional text attached "
        "to the log entry (optional). Provides additional details of the event "
        "occurrence."), DisplayName("Message")
        ]
    string Message;
        [Description ("The OriginalEvent property is an embedded copy of "
        "the event instance received by the local logging consumer."),
        DisplayName("Original Event")
        ]
    ___Event OriginalEvent;
        [Key, Description ("The RecordNumber identifies the event within "
        "the Eventlog logfile. This is specific to the logfile and is used "
        "together with the logfile name to uniquely identify an instance "
        "of this class."), DisplayName("User")
        ]
    string User;
};
```

The distributed event 500 also includes payload 504, which contains multiple payload objects (labeled "Payload Object 1" through "Payload Object N"). The payload objects are used by the consumers (e.g., consumers 316, 322, 328, and 334 of FIG. 4) to take the appropriate actions in response to the distributed event. The appropriate actions are defined by the various payload objects in the payload 504. The payload objects are free-format embedded objects that preserve the event data associated with the original event.

As discussed above, all events have the same header format regardless of the event source. This standard header format simplifies the handling of events and simplifies the administrative task of defining the processing of events. Additionally, the flexible payload format allows free-format embedded objects which maintain the parameters and other data of the original event.

Figure 7:
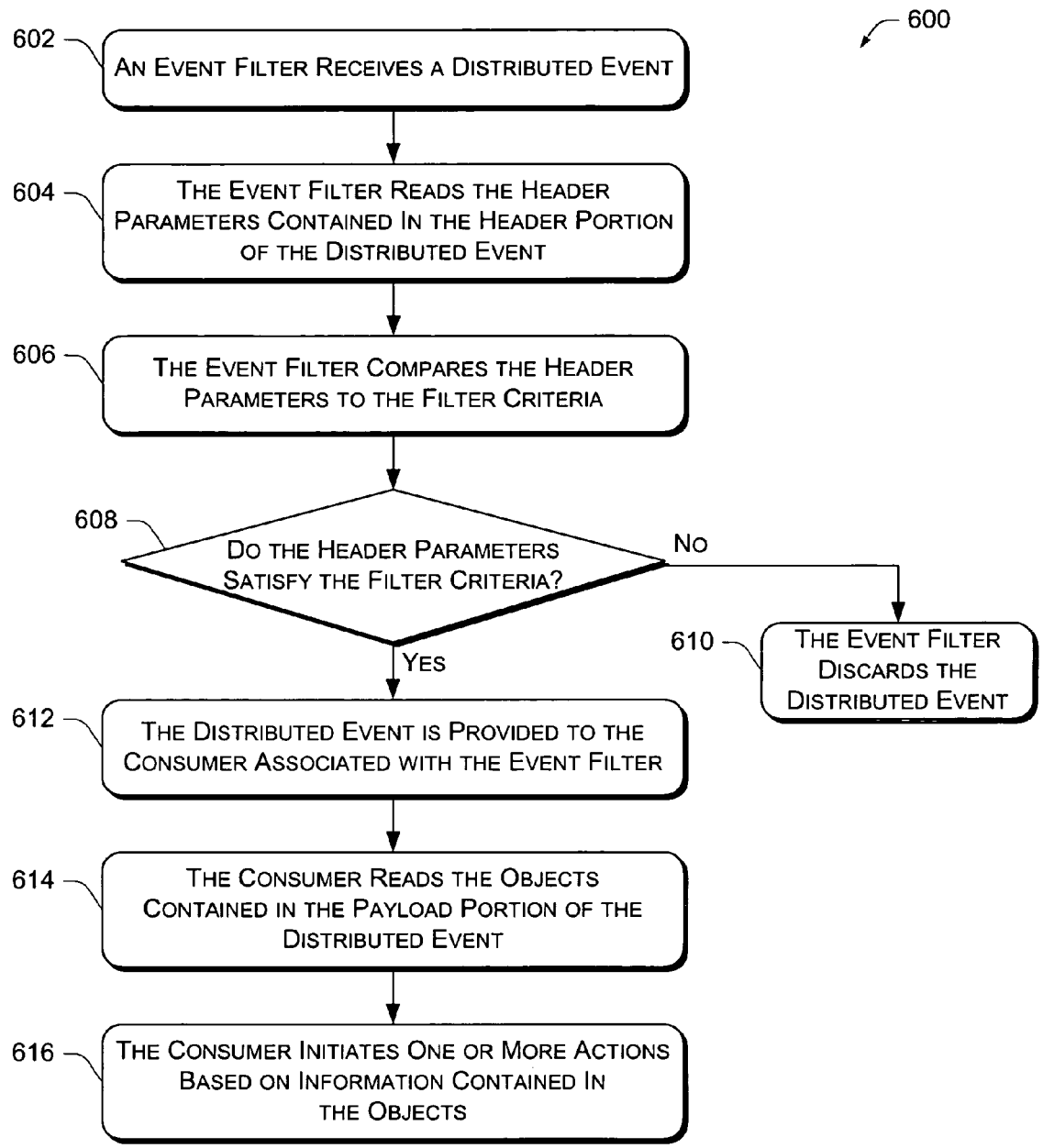
FIG. 7 is a flow diagram illustrating a procedure for handling distributed events.

FIG. 7 is a flow diagram illustrating a procedure 600 for handling distributed events. An event filter (e.g., filter 314, 320, 326, or 332 of FIG. 4) receives a distributed event (block 602). The event filter reads the header parameters contained in the header portion of the distributed event (block 604). Next, the event filter compares the header parameters to the filter criteria of the event filter (block 606). If the header parameters of the distributed event do not satisfy the filter criteria of the event filter (block 606), the procedure 600 branches to block 610, where the event filter discards the distributed event. If the header parameters of the distributed event satisfy the filter criteria of the event filter, the procedure 600 continues to block 612, where the distributed event is provided to the consumer associated with the event filter. The consumer then reads the objects contained in the payload portion of the distributed event (block 614). Finally, the consumer initiates one or more actions based on the information contained in the objects (block 616). The consumer may perform the actions itself or may cause another device or routine to perform the appropriate actions defined in the objects.

FIG. 8 illustrates an example of a suitable operating environment in which the event distribution and event handling system and method may be implemented. The illustrated operating environment is only one example of a suitable operating environment and is not intended to suggest any limitation as to the scope of use or functionality of the invention. Other well-known computing systems, environments, and/or configurations that may be suitable for use with the invention include, but are not limited to, personal computers, server computers, hand-held or laptop devices, multiprocessor systems, microprocessor-based systems, programmable consumer electronics, gaming consoles, cellular telephones, network PCs, minicomputers, mainframe computers, distributed computing environments that include any of the above systems or devices, and the like.

FIG. 8 shows a general example of a computer 700 that can be used in accordance with the invention. Computer 700 is shown as an example of a computer that can perform the various functions described herein. Computer 700 includes one or more processors or processing units 702, a system memory 704, and a bus 706 that couples various system components including the system memory 704 to processors 702.

The bus 706 represents one or more of any of several types of bus structures, including a memory bus or memory controller, a peripheral bus, an accelerated graphics port, and a processor or local bus using any of a variety of bus architectures. The system memory 704 includes read only memory (ROM) 708 and random access memory (RAM) 710. A basic input/output system (BIOS) 712, containing the basic routines that help to transfer information between elements within computer 700, such as during start-up, is stored in ROM 708. Computer 700 further includes a hard disk drive 714 for reading from and writing to a hard disk, not shown, connected to bus 706 via a hard disk drive interface 715 (e.g., a SCSI, ATA, or other type of interface); a magnetic disk drive 716 for reading from and writing to a removable magnetic disk 718, connected to bus 706 via a magnetic disk drive interface 719; and an optical disk drive 720 for reading from and/or writing to a removable optical disk 722 such as a CD ROM, DVD, or other optical media, connected to bus 706 via an optical drive interface 723. The drives and their associated computer-readable media provide nonvolatile storage of computer readable instructions, data structures, program modules and other data for computer 700. Although the exemplary environment described herein employs a hard disk, a removable magnetic disk 718 and a removable optical disk 722, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 718, optical disk 722, ROM 708, or RAM 710, including an operating system 728, one or more application programs 730, other program modules 732, and program data 734. A user may enter commands and information into computer 700 through input devices such as keyboard 736 and pointing device 738. Other input devices (not shown) may include a microphone, joystick, game pad, satellite dish, scanner, or the like. These and other input devices are connected to the processing unit 702 through an interface 726 that is coupled to the system bus (e.g., a serial port interface, a parallel port interface, a universal serial bus (USB) interface, etc.). A monitor 742 or other type of display device is also connected to the system bus 706 via an interface, such as a video adapter 744. In addition to the monitor, personal computers typically include other peripheral output devices (not shown) such as speakers and printers.

Computer 700 operates in a networked environment using logical connections to one or more remote computers, such as a remote computer 746. The remote computer 746 may be another personal computer, a server, a router, a network PC, a peer device or other common network node, and typically includes many or all of the elements described above relative to computer 700, although only a memory storage device 748 has been illustrated in FIG. 8. The logical connections depicted in FIG. 8 include a local area network (LAN) 750 and a wide area network (WAN) 752. Such networking environments are commonplace in offices, enterprise-wide computer networks, intranets, and the Internet. In certain embodiments, computer 700 executes an Internet Web browser program (which may optionally be integrated into the operating system 728) such as the "Internet Explorer" Web browser manufactured and distributed by Microsoft Corporation of Redmond, Wash.

When used in a LAN networking environment, computer 700 is connected to the local network 750 through a network interface or adapter 754. When used in a WAN networking environment, computer 700 typically includes a modem 756 or other means for establishing communications over the wide area network 752, such as the Internet. The modem 756, which may be internal or external, is connected to the system bus 706 via a serial port interface 726. In a networked environment, program modules depicted relative to the personal computer 700, or portions thereof, may be stored in the remote memory storage device. It will be appreciated that the network connections shown are exemplary and other means of establishing a communications link between the computers may be used.

Computer 700 typically includes at least some form of computer readable media. Computer readable media can be any available media that can be accessed by computer 700. By way of example, and not limitation, computer readable media may comprise computer storage media and communication media. Computer storage media includes volatile and nonvolatile, removable and nonremovable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 700. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   receiving a first event at a first event filter, the first event filter having an associated filter criteria;
   applying the filter criteria associated with the first event filter to the first event;
   when the first event satisfies the filter criteria associated with the first event filter, then:
   transforming the first event into a second event; and
   communicating the second event to a plurality of second event filters each of the plurality of event filters having an associated filter criteria and each of the plurality of event filters being associated with one of a plurality of event consumers, wherein at least one individual event consumers of the plurality of event consumers generates an email message when the second event satisfies the filter criteria associated with the corresponding event filter.

2. The method as recited in claim 1 wherein the second event includes a header having a plurality of parameters, wherein the event header has a standard data format regardless of event source.

3. The method as recited in claim 1 wherein the second event includes a payload including a plurality of payload objects.

4. The method as recited in claim 1 wherein the second event filter has no knowledge of the first event.

5. The method as recited in claim 1 wherein at least one different individual event consumer of the plurality of event consumers logs the second event to a storage device when the second event satisfies the filter criteria associated with the second event filter.

6. The method as recited in claim 1 wherein at least one different individual event consumer of the plurality of event consumers forwards the second event to a destination when the second event satisfies the filter criteria associated with the second event filter.

7. One or more computer-readable memories containing a computer program that is executable by a processor to perform the method recited in claim 1.

8. A method comprising:
   receiving a first event having a first format;
   transforming the first event into a second event having a second format, wherein transforming the first event into a second event comprises:
   generating an event header having a plurality of parameters, wherein the plurality of parameters are arranged in a standard data format;
   generating an event payload having a plurality of payload objects, wherein the plurality of payload objects identify at least one action to perform in response to the event;
   applying the second event to an event filter having an associated filter criteria;
   communicating the second event to an event consumer when the second event satisfies the filter criteria associated with the event filter, and,
   generating an email message at the event consumer.

9. The method as recited in claim 8 wherein the plurality of parameters are arranged in a standard data format regardless of the first event source.

10. One or more computer-readable memories containing a computer program that is executable by a processor to perform the method recited in claim 8.

11. An apparatus comprising:
    an event transformer to receive a first event and transform the first event into a second event, the second event having a standard data format regardless of the first event data format;
    a plurality of event filters coupled to the event transformer, the event filters to apply filter criteria to the second event; and
    a plurality of event consumers coupled to the plurality of event filters, the event consumers to perform an action when the second event satisfies the filter criteria applied by the event filters, wherein the second event includes an event header having a plurality of parameters arranged in a standard data format, and wherein the plurality of parameters in the event header are applied to the event filters to determine whether the associated event satisfies the filter criteria, wherein the action performed by at least one of the plurality of event consumers when the second event satisfies the filter criteria associated with the second event filter is generating an email message.

12. The apparatus as recited in claim 11 wherein the event transformer operates independently of the event filters and independently of the event consumers.

13. The apparatus as recited in claim 11 wherein the second event includes an event payload having a plurality of payload objects.

14. The apparatus as recited in claim 11 wherein the second event includes an event payload having a plurality of payload objects, and wherein the plurality of payload objects identify at least one action to perform in response to the event.

15. One or more computer storage media having stored thereon a computer program that, when executed by one or more processors, causes the one or more processors to:
    receive a first event having a first data format;
    filter the first event using a first filter criteria;
    transform the first event into a second event having a second data format when the first event satisfies the first filter criteria, wherein the second data format includes an event header having a plurality of parameters and an event payload having a plurality of payload objects; and
    communicate the second event to an event action handler when the first event satisfies the first filter criteria wherein the plurality of payload objects in the event payload are used by an event consumer that receives the second event to identify an action to perform in response to the second event, and wherein the action is selected from a list of potential actions that includes generating an email message.

16. The one or more computer storage media as recited in claim 15 wherein the plurality of parameters in the event header are arranged in a standard format.

17. The one or more computer storage media as recited in claim 15 wherein the plurality of parameters in the event header are used to filter the second event.

18. The one or more computer storage media as recited in claim 15 wherein the event action handler performs at least one action in response to the second event.

19. The method as recited in claim 1 wherein the filter criteria associated with the first event filter includes an event type.

20. The method as recited in claim 1 wherein the filter criteria associated with the second event filter includes an event type.

* * * * *